United States Patent
Beyabani

(10) Patent No.: US 8,887,189 B2
(45) Date of Patent: Nov. 11, 2014

(54) METHODS AND SYSTEMS FOR PROVIDING SYNCHRONIZED DISPLAY OF CONTENT

(75) Inventor: Syed Zafar Beyabani, Irving, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 974 days.

(21) Appl. No.: 11/863,590

(22) Filed: Sep. 28, 2007

(65) Prior Publication Data

US 2009/0089824 A1  Apr. 2, 2009

(51) Int. Cl.
  *H04H 60/32*  (2008.01)
  *H04N 21/242*  (2011.01)
  *H04N 21/426*  (2011.01)
  *H04N 21/6377*  (2011.01)
  *H04N 7/173*  (2011.01)
  *H04N 21/258*  (2011.01)
  *H04H 60/80*  (2008.01)

(52) U.S. Cl.
  CPC .......... *H04H 60/80* (2013.01); *H04N 21/242* (2013.01); *H04N 21/42684* (2013.01); *H04N 21/6377* (2013.01); *H04N 7/17318* (2013.01); *H04N 21/25816* (2013.01)
  USPC .......................................................... 725/17

(58) Field of Classification Search
  CPC ..................................................... H04H 60/43
  USPC ...................................................... 725/78, 17
  See application file for complete search history.

(56) References Cited

U.S. PATENT DOCUMENTS

| | | | |
|---|---|---|---|
| 6,988,276 B2 * | 1/2006 | Sitnik | 725/10 |
| 7,114,172 B2 * | 9/2006 | Lord | 725/80 |
| 2002/0073229 A1 * | 6/2002 | Hayashi | 709/237 |
| 2002/0184652 A1 * | 12/2002 | Cezeaux | 725/132 |
| 2003/0002849 A1 | 1/2003 | Lord | |
| 2004/0015985 A1 * | 1/2004 | Kweon | 725/30 |
| 2006/0026279 A1 * | 2/2006 | Zigmond et al. | 709/224 |
| 2006/0218575 A1 * | 9/2006 | Blair | 725/28 |
| 2006/0218581 A1 * | 9/2006 | Ostrowska et al. | 725/38 |
| 2006/0271960 A1 * | 11/2006 | Jacoby et al. | 725/46 |
| 2007/0079340 A1 * | 4/2007 | McEnroe | 725/78 |
| 2007/0180382 A1 * | 8/2007 | Kortum et al. | 715/716 |
| 2007/0199025 A1 * | 8/2007 | Angiolillo et al. | 725/47 |
| 2007/0245390 A1 | 10/2007 | Kwak | |
| 2008/0235733 A1 * | 9/2008 | Heie et al. | 725/46 |

FOREIGN PATENT DOCUMENTS

WO  03/058965  7/2003

* cited by examiner

*Primary Examiner* — Nathan Flynn
*Assistant Examiner* — Alfonso Castro

(57) ABSTRACT

Systems and methods may include receiving a device identifier that identifies a first device, the first device being capable of causing display of first content at a first display device, and communicating a synchronization request that includes the device identifier via a network. Systems and methods may further include receiving an event message from the first device via the network, the event message identifying the first content the first device is causing display at the first display device, wherein the event message is useable to synchronize second content a second device causes display at a second display device with the first content the first device is causing display at the first display device.

18 Claims, 7 Drawing Sheets

METHODS AND SYSTEMS FOR PROVIDING SYNCHRONIZED DISPLAY OF CONTENT

BACKGROUND INFORMATION

Television signals have typically been broadcast to television sets via a telecommunication system, such as a terrestrial cable television network or a satellite television network. Viewers are able to tune a television set to a particular a channel of the television signal for display of content associated with the channel at the television set. Telecommunication systems for distributing television signals, however, have been limited to providing one-way communication from the telecommunication system to the television sets. These and other problems exist with conventional systems.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

Systems and methods in accordance with exemplary embodiments may include receiving a device identifier identifying a first device, the first device being capable of causing display of first content at a first display device, and communicating a synchronization request that includes the device identifier via a network. Systems and methods in accordance with exemplary embodiments also may include receiving an event message from the first device via the network, the event message identifying the first content the first device is causing to be displayed at the first display device, wherein the event message is useable to synchronize second content a second set top box causes display at a second display device with the first content the first device is causing display at the first display device.

The description below describes servers, set top boxes, display devices, wireless devices, etc., that may include one or more modules, some of which are explicitly shown in the figures, others are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, set top boxes, display devices, wireless devices, etc.) separately. The functions described as being performed at various components may be performed at other components, and the various components may be combined and/or separated. Other modifications also may be made.

Figure 1:
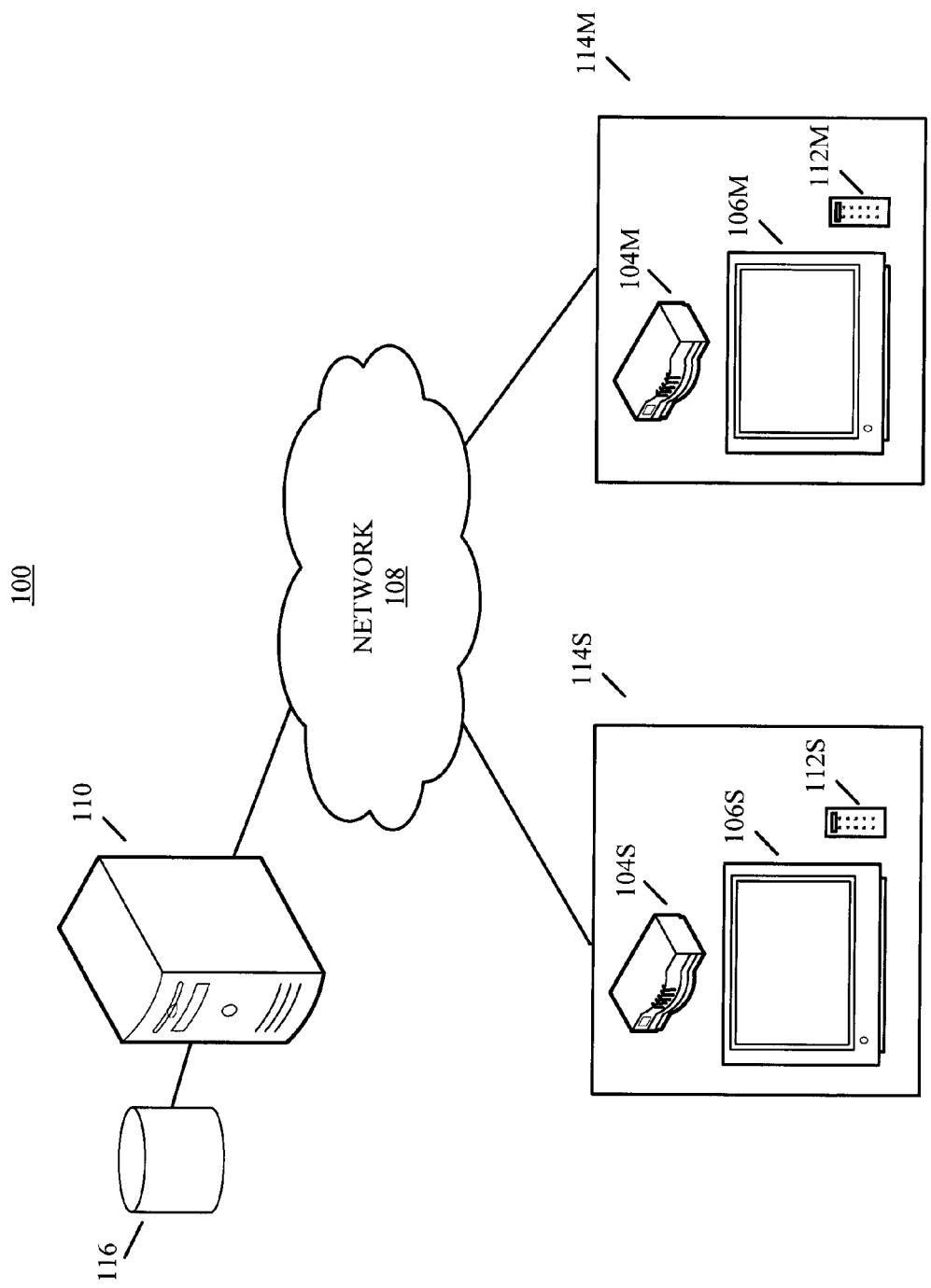
FIG. 1 illustrates a system for synchronizing content displayed at different display devices in accordance with exemplary embodiments.

FIG. 1 illustrates a system for synchronizing content displayed at different display devices in accordance with exemplary embodiments. The system 100 may permit synchronization of a slave set top box 104S with a master set top box 104M, thereby permitting a viewer watching content at a slave display device 106S to view the same content that is being displayed at a master display device 106M. For example, the system 100 may allow multiple people to watch the same television program at the same time under the control of one set top box even though the people are physically located at different user premises 114 or in different rooms within the same user premises 114.

In an exemplary embodiment, each user premise 114S and 114M may include a set top box 104 and a display device 106. As depicted in FIG. 1, the system 100 includes a master set top box 104M and a master display device 106M at a master user premise 114M, and a slave set top box 104S and a slave display device 106S at a user premise 110S. It is also noted that a single user premise 114 may include multiple set top boxes 104 and multiple display devices 106. The set top boxes 104 also may be remotely located from the display device 106. Each set top box 104 may be used to control one or more display devices 106 and each set top box 104 may be communicatively coupled via a network 108.

In an exemplary embodiment, the master set top box 104M may be communicatively coupled with a server 110 and with the slave set top box 104S via the network 108. The network 108 may be a wired network, a wireless network, and/or combinations thereof. The network 108 may be capable of communicating a content signal received from the server 110 to the set top boxes 104. The content signal may be useable to display content at the display device 106. Content may be video, audio, text, combinations thereof, and/or or other types of visually or audibly displayable information. The content signal may be, for example, television signals and/or audio signals that may be in digital and/or analog form, data, requests, other digital and/or analog information, and/or combinations thereof. The content signal may include a plurality of channels, where the set top box 104 may tune to a particular channel to cause display of the content on the channel at a display device 106, as is well known in television systems. For example, the viewer may use a user input device 112 (e.g., remote control, computer keyboard, computer mouse, etc.) to control the channel the set top box 104 causes display at the display device 106. The user input device 112 also may be integrated with either of the set top box 104 or the display device 106, or both. In an exemplary embodiment, the content signal may be a cable television signal complying with the American National Standard Society of Cable Telecommunication Engineers standard ANSI/SCTE 07 2006 titled "Digital Transmission Standard for Cable Television," the contents of which are incorporated herein by reference in its entirety. The content signal also may comply with other standards.

The network 108 may transport the content signal and/or various messages in analog and/or digital form from the server 110 to the set top boxes 104. The network 108 also may transport analog and/or digital messages from the set top boxes 104 to the server 110. In an exemplary embodiment, at least a portion of the network 108 may comply with the Telecommunication Union Telecommunication Standard (ITU-T) Recommendation G.983.1 titled "Broadband Optical Access Systems based on Passive Optical Networks (PON)," January 2005, the contents of which are incorporated herein by reference in its entirety. The network 108 also may comply with other standards. In an exemplary embodiment, the network 108 may communicate with the set top boxes 104 using three separate wavelengths, where one of the wavelengths may exchange data using a data communication session, such as, but not limited to, Internet Protocol, another wavelength may communicate the content signal to the set top boxes 104, and the last wavelength may receive messages from the set top boxes 104. The network 108 also may be a cable television network, a satellite network, combinations thereof, or other networks capable of distributing a content signal from the server 110 to the set top boxes 104, and exchanging information, messages, requests, etc., between the server 110 and the set top boxes 104 via the network 108.

In an exemplary embodiment, the set top box 104 may be a hardware device that may receive a content signal from the network 108, may assist to cause display of at least a portion of the content signal at the display device 106, and may communicate messages with the network 108. For example, the master set top box 104M may cause display of a cable television signal at the master display device 106M, which may be, for example, a television set. In another example, the set top box 104 may be a computer and the display device 106 may be a computer monitor. The set top box 104 may act as either a master set top box or as a slave set top box.

It is noted that the set top box 104 and the display device 106 are depicted and described as being separate devices in FIG. 1. The set top box 104 and the display device 106, however, may be combined into a single unit. Also, the functions of the set top box 104 and the display device 106 may be implemented in a mobile phone, a wireless device, or any other device that may communicate via the network 108.

In an exemplary embodiment, the system 100 may synchronize the content being displayed at the slave display device 106S and at the master display device 106M. Synchronizing the slave set top box 104S with the master set top box 104M may permit a viewer watching content (e.g., a television program) at the slave display device 106S to view the same program at about the same time that a viewer is watching the program at the master display device 106M. For example, the system 100 may allow multiple people to watch the same television program at about the same time even though they are physically located at different user premises 114 and/or in different rooms within the same user premises 114. The server 110 may provide for covert and overt synchronization of the content.

Overt synchronization may refer to the situation where the viewer at the master user premises 114M is aware that the master set top box 104M is synchronized with the slave set top box 104S. For example, the slave set top box 104S may send a synchronization request to the master set top box 104M, and the master set top box 104M may prompt the master viewer to permit or deny the synchronization request.

Covert synchronization may refer to the situation where the viewer at the master user premises 114M is not aware that the content being displayed at the master display device 106M is synchronized with the content being displayed at the slave set display device 106S. For example, parents may purchase multiple set top boxes 104 and may remotely monitor what programs their children are watching. The server 110 may maintain a synchronization database 116 that associates the master and slave set top boxes 104 and that may be accessed to determine whether to permit covert synchronization.

In an exemplary embodiment, the synchronization database 116 may store a table that may include set top box identifiers of the master set top boxes 104M for which covert synchronization is permitted. The set top box identifier may be a number sequence, a letter sequence, a symbol sequence, combinations thereof, and/or other information to uniquely identify the set top box 104. The synchronization database 116 also may store authorization codes for authenticating slave set top boxes 104S for use in covertly synchronizing with one or more master set top boxes 104M.

In an exemplary embodiment, when a viewer desires to covertly synchronize the set top boxes 104, the viewer may instruct the slave set top box 104S to generate a covert synchronization request. The covert synchronization request may include an authentication code, a slave set top box identifier, and a master set top box identifier. The authentication code may be information to identify the viewer as having privileges to covertly synchronize with the master set top box 104M. The authentication code may be a username and password, or other information useable to authenticate the viewer.

The slave set top box 104S may communicate the covert synchronization request to the server 110 over the network 108 and the server 110 may receive the covert synchronization request from the slave set top box 104S. The server 110 may query the synchronization database 116 based on the master set top box identifier to identify an authentication code associated with the master set top box 104M. If the authentication code retrieved from the synchronization database 116 matches the authentication code received in the covert synchronization request, the server 110 may communicate a covert synchronization request to instruct the master set top box 104M to send information from the master set top box 104M to the slave set top box 104S for covert synchronization. The master set top box 104M may then begin monitoring events to permit the slave set top box 104S to synchronize the content displayed at the slave display device 106S.

If the authentication code retrieved from the synchronization database 116 does not match the authentication code received in the covert synchronization request, the server 110 may communicate a reject message to the slave set top box 104S. The reject message may include information displayable to the viewer at the slave set top box 104S informing the viewer that the authentication code could not be used to authenticate the viewer for covert synchronization.

For overt synchronization, a slave set top box 104S may communicate a synchronization request to the server 110 and/or to the master set top box 104M via the network 108.

This type of synchronization request may be considered as an overt synchronization request. The synchronization request may include a set top box identifier of the slave set top box 104S and of the master set top box 104M. Upon receipt of the synchronization request, the master set top box 104M may cause the master display device 106M to display a graphical user interface prompting the viewer to select whether to permit synchronization with the slave set top box 104S. If the viewer does not permit synchronization, the viewer may use the user input device 112 to instruct the master set top box 104M to communicate a reject message to the slave set top box 104S. The reject message may inform the slave set top box 104S that the synchronization request has been denied. If the viewer permits synchronization, the viewer may use the user input device 112 to instruct the master set top box 104M to communicate an accept message to the slave set top box 104S. The accept message may inform the slave set top box 104S that the synchronization request has been accepted. The master set top box 104M may then begin monitoring events to permit the slave set top box 104S to synchronize the content displayed at the slave display device 106S.

In an exemplary embodiment, to synchronize the set top boxes 104, the master set top box 104M may track events based on inputs received from the user input device 112 and may communicate an event message describing those events to the server 110 and/or slave set top box 104S via the network 108. The events may be identified based on instructions received from the user input device 112 to instruct the master set top box 104M to cause the master display device 106M to display a particular content (e.g., channel, program, etc.). Events may occur when the master display device 106M is turned on/off, when the display module 204 is instructed to cause display of a different channel and/or program at the master display device 106M, when the master set top box 104M requests an on-demand program, when a viewer uses the user input device 112 to instruct the master set top box 104M to cause the master display device 106M to cause display of an interactive program guide (e.g., a television program guide), when the viewer uses the user input device 112 to navigate through the interactive program guide, when the viewer uses the user input device 112 to interact with the interactive program guide (e.g., for selecting settings, parental control options, searching, marketplace browsing, etc.), combinations thereof, and/or performs other actions to request a program, to view a channel, and/or to select a field in an interactive program guide.

For example, a viewer may instruct the master set top box 104M to change a television channel to cause the master display device 106M to transition from displaying content associated with a first television channel to displaying content associated with a second television channel. The master set top box 104M may identify this changing of the channel as an event, and may communicate an event message that includes a channel identifier of the second television channel to the server 110 via the network 108 and/or to the slave set top box 104S via the network 108. The slave set top box 104S may receive the event message, and may process the event message to obtain the channel identifier of the second television channel. The slave set top box 104S may then tune to the second television channel to cause the slave display device 106S to transition from displaying the first television channel to displaying the second television channel. In another example, the master set top box 104M may communicate an event message that includes request for an on-demand program to the server 110. The server 110 may receive the event message and may communicate the on-demand program to both the master set top box 104M and to the slave set top box 104S. Thus, the master set top box 104M may communicate an event message that may be used to synchronize the content being displayed at the master display device 106M with the content being displayed at the slave display device 106S.

It is noted that system 100 illustrates a simplified view of various components included in a content distribution system, and that other hardware devices and software not depicted may be included in the system 100. It is also noted that the system 100 illustrates only a single server 110, a single network 108, and display devices 106 and set top boxes 104 at two user premises 114. It will be appreciated that multiple instances of these devices may be used, and that a single master set top box 104M may be used to control one or more slave set top boxes 104S. It is also noted that the server 110 and the synchronization database 116 may be omitted from the system 100, and the functions performed by the server 110 and the synchronization database 116 may be performed at either or both of the slave set top box 104S or the master set top box 104M. The set top box 104 is discussed in further detail below.

Figure 2:
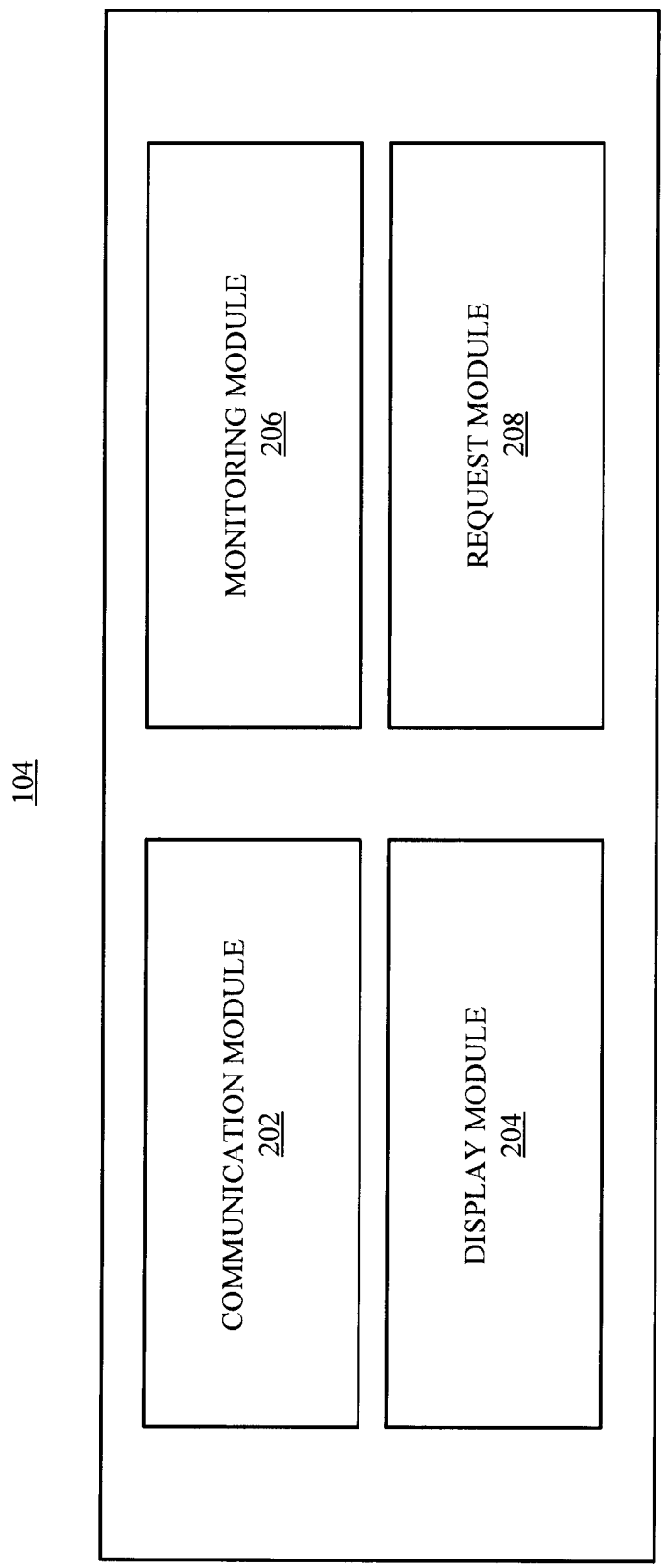
FIG. 2 illustrates various modules included in a set top box in accordance with exemplary embodiments.

FIG. 2 illustrates various modules included in a set top box in accordance with exemplary embodiments. In an exemplary embodiment, the set top box 104 may include a communication module 202, a display module 204, a monitoring module 206, and a request module 208. The modules 202, 204, 206, and 208 may be included in set top boxes 104 that are acting as either a slave set top box or as a master set top box. It is noted that the modules 202, 204, 206, and 208 are exemplary. The functions performed by the modules 202, 204, 206, and 208 may be performed by other modules remote or local to the set top box 106, and the modules 202, 204, 206, and 208 may be combined and/or separated.

The communication module 202 may provide communication between the set top box 104 and the network 108. The communication module 202 may forward the content signal and/or messages received from the network 108 to the other modules 204, 206, and 208, and may communicate messages received from the modules 204, 206, and 208 to the network 108.

The display module 204 may control display of the content signal and/or various graphical user interfaces at the display device 106. To cause display of the content signal, the display module 204 may receive instructions from the user input device 112, may tune to a particular program and/or channel of the content signal based on the received instructions, and may cause display of the particular program and/or channel at the display device 106. The display module 204 also may cause display of various graphical user interfaces to permit the user to synchronize the slave set top box 104S with the master set top box 104M. Various examples of graphical user interfaces will be described in further detail below.

The monitoring module 206 may provide for covert and/or overt monitoring of the content (e.g., programs, channels, etc.) the master set top box 104M is causing display at the master display device 106M. When the master set top box 104M has received the covert synchronization request from the server 110 and/or the viewer has permitted overt monitoring, the monitoring module 206 may monitor events based on inputs received from the user input device 112 to synchronize the master set top box 104M with one or more slave set top boxes 104S.

When an event is identified, the monitoring module 206 may forward event information, and a content identifier (e.g., a program identifier, a channel identifier, etc.) to the request module 208. The event information may identify the type of event that has occurred (e.g., change of channel, requesting an on-demand program, etc.). The content identifier may be a number sequence, a letter sequence, a symbol sequence, combinations thereof, and/or other information to uniquely identify the content (e.g., program, channel, etc.) being displayed at the master display device 104M.

The request module 208 may receive the event information and the content identifier from the monitoring module 206. The request module 208 may then generate an event message including the event information, the content identifier, and the master set top box identifier of the master set top box 104M. The request module 208 may then communicate the event message to the server 110 and/or to the slave set top box 104S via the network 108. The event message may inform the server 110 about the event and may be used to synchronize the slave set top box 104S with the master set top box 104M.

When operating as a slave, upon receipt of the event message from the server 110 and/or the master set top box 104M, the display module 204 of the slave set top box 104S may examine the event message to identify a content identifier. The display module 204 may then cause display of the content associated with the content identifier. For example, the event message may include a channel identifier for Channel X, and the display module 204 may tune to Channel X in the content signal to cause display of Channel X at the slave display device 106S. Thus, the content being displayed at the slave display device 106S may be synchronized with the content being displayed at the master display device 106M, thereby permitting viewers at both locations to view the same content.

The following describes various graphical user interface in accordance with exemplary embodiments that may be presented to the viewers at the master and slave set top boxes 104. To generate the synchronization request, the viewer may use the user input device 112 to communicate a synchronization graphical user interface display request to the slave set top box 104S. The viewer may use the user input device 112 to input information into a synchronization graphical user interface to identify the master set top box 104M and optionally an authentication code.

Figure 3:
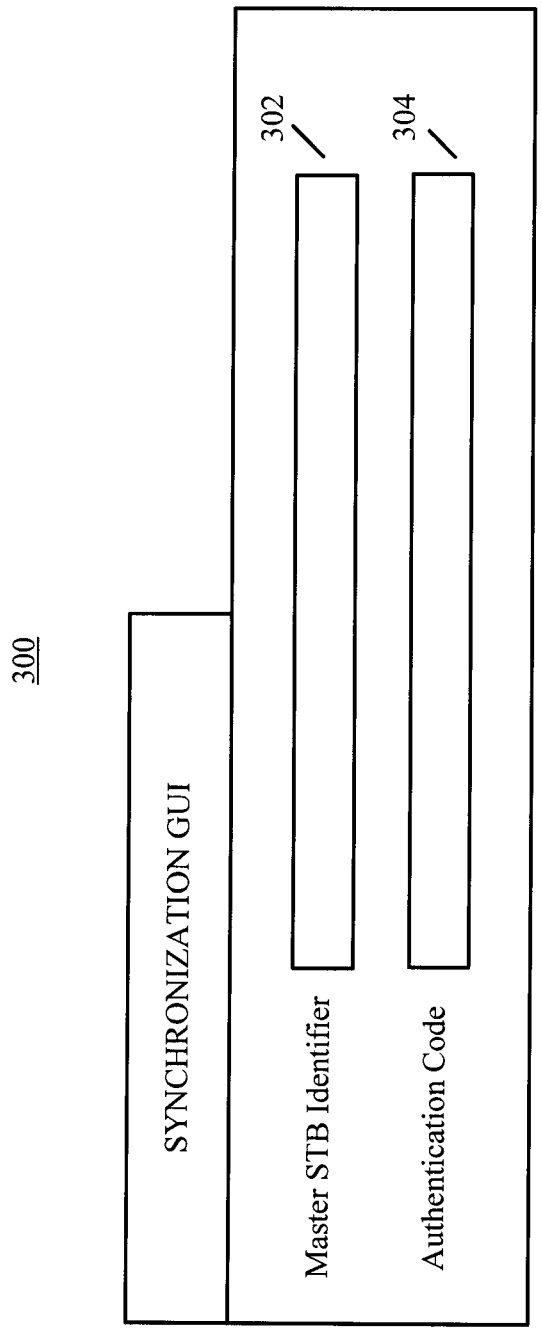
FIG. 3 illustrates a synchronization graphical user interface in accordance with exemplary embodiments.

FIG. 3 illustrates a synchronization graphical user interface in accordance with exemplary embodiments. The display module 204 may cause display of the synchronization graphical user interface 300 to permit a viewer at the slave set top box 104S to input data to request synchronization with a master set top box 104M. For example, the viewer may use a television remote control, a mouse, or other input device to instruct the slave set top box 104S to cause display of the synchronization graphical user interface 300.

In an exemplary embodiment, the synchronization graphical user interface 300 may include a master set top box identifier field 302 and an authentication code field 304. The master set top box identifier field 302 may receive an input from the user to identify the master set top box 104M with which the viewer desires to synchronize. The master set top box identifier field 302 may be a drop-down menu, may be a text field, or it may be other types of input fields capable of receiving information from the viewer to identify and/or select the master set top box 104M. In an exemplary embodiment, each set top box 104 may include a unique device serial number that may be used to uniquely identify a particular set top box 104. Also, each viewer may provide the set top box 104 with a name (e.g., Ron's television, kids room, kitchen TV, poolside23, 12352, etc.), which may associated with the unique device serial number, that may be used to identify the set top box 104.

The authentication code field 304 may permit the viewer to input an authentication code to permit covert monitoring of the master set top box 104M. The authentication code may be used to identify the viewer as being an authorized viewer. For example, a parent may set up an authorization code for the master set top box 104M, and when the authentication code is input in the authentication information field 304, the authentication code may be communicated to the server 110 for authorization to covertly monitor the master set top box 104M. If the authentication code is correct, the server 110 may permit the slave set top box 104 to covertly synchronize with the master set top box 104M.

Once the user completes the synchronization graphical user interface 300, the request module 208 may generate and communicate a synchronization request to the server 110 and/or to the master set top box 104M via the network 108. In an exemplary embodiment, if the synchronization request includes the authorization code, the request module 208 may communicate the synchronization request to the server 110 via the network 108 to determine whether to permit covert synchronization. In another exemplary embodiment, if the synchronization request does not include the authorization code, the request module 208 may communicate the synchronization request to the master set top box 104M via the network 108. Upon receipt of the synchronization request, the master set top box 104M may cause display of an authorization request graphical user interface at the master display device 106M.

Figure 4:
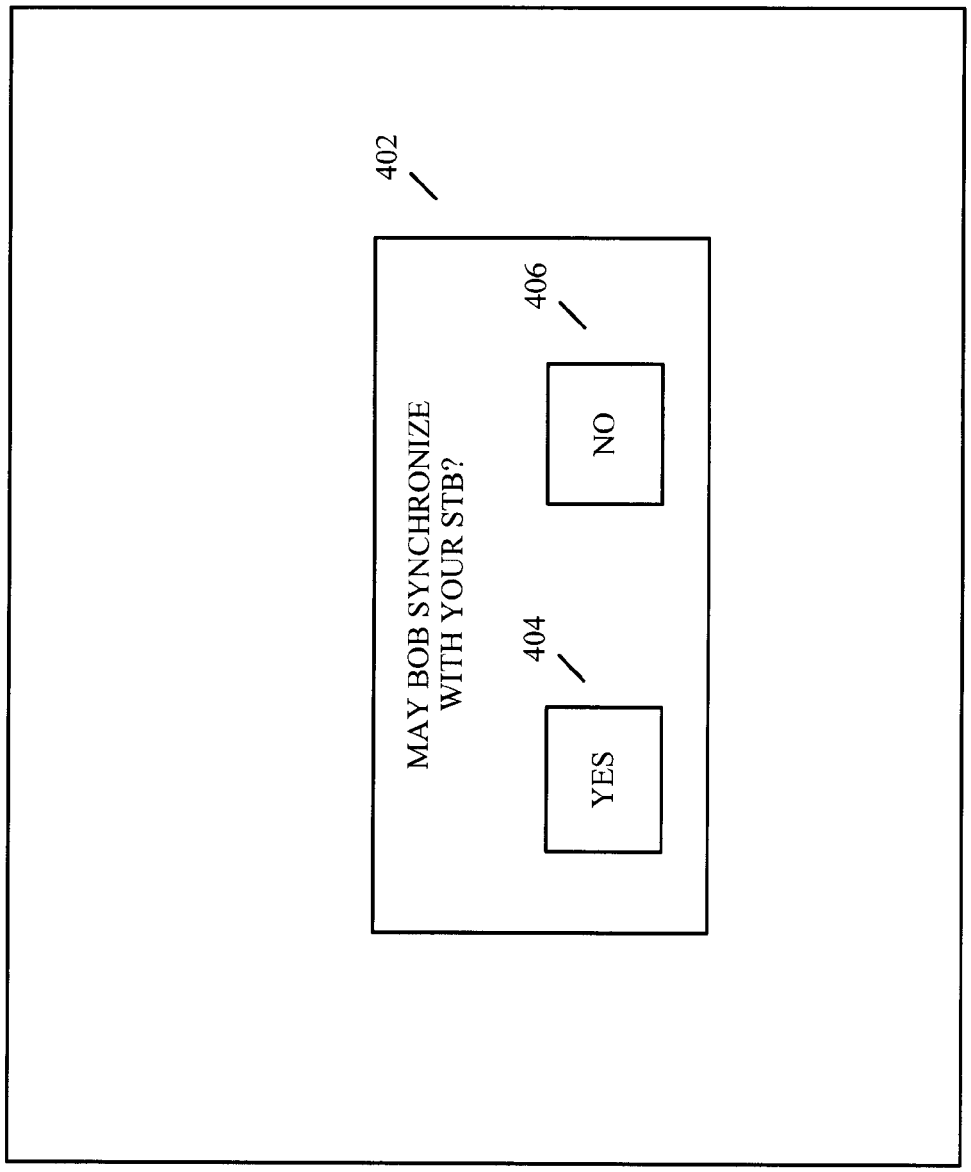
FIG. 4 illustrates an authorization request graphical user interface in accordance with exemplary embodiments.

FIG. 4 illustrates an authorization request graphical user interface in accordance with exemplary embodiments. The authorization request graphical user interface 402 may prompt the viewer at the master user premises 114M to permit or deny the viewer at the slave user premises 114S to synchronize with the master set top box 104M. In an exemplary embodiment, the authorization request graphical user interface 402 may identify the slave set top box 104S or the viewer associated with the slave set top box 104S, and also may include a "yes" field 404 and a "no" field 406. For example, the authorization request graphical user interface 402 depicted in FIG. 4 may appear as a pop-up window that includes the text "May Bob synchronize with your STB?"

The viewer may use the user input device 112 to select either the "yes" field 404 or the "no" field 406 presented at the master display device 106M. For example, the viewer may select a key on an user input device 112 to select either the "yes" field 404 or the "no" field 406 presented at the master display device 106M. If the "yes" field 404 is selected, the master set top box 104M may communicate an acceptance message to the server 110 and/or to the slave set top box 104S to identify that the user of the master set top box 104M has permitted the viewer at the slave user premises 104S to synchronize with the master set top box 104M. The master set top box 104M also may begin sending event messages to the server 110 permitting the server to enable the slave set top box 104S to synchronize with the master set top box 104M. If the viewer at the master user premises 114M selects the "no" field 406, the master set top box 104M may communicate a reject message to the server 110 and/or to the slave set top box 104S via the network 108. The reject message may indicate that the viewer at the master set top box 104M does not wish to permit the slave set top box 104S to synchronize with the master set top box 104M. If synchronization is permitted, the slave set top box 104S may cause display of synchronized content.

Figure 5:
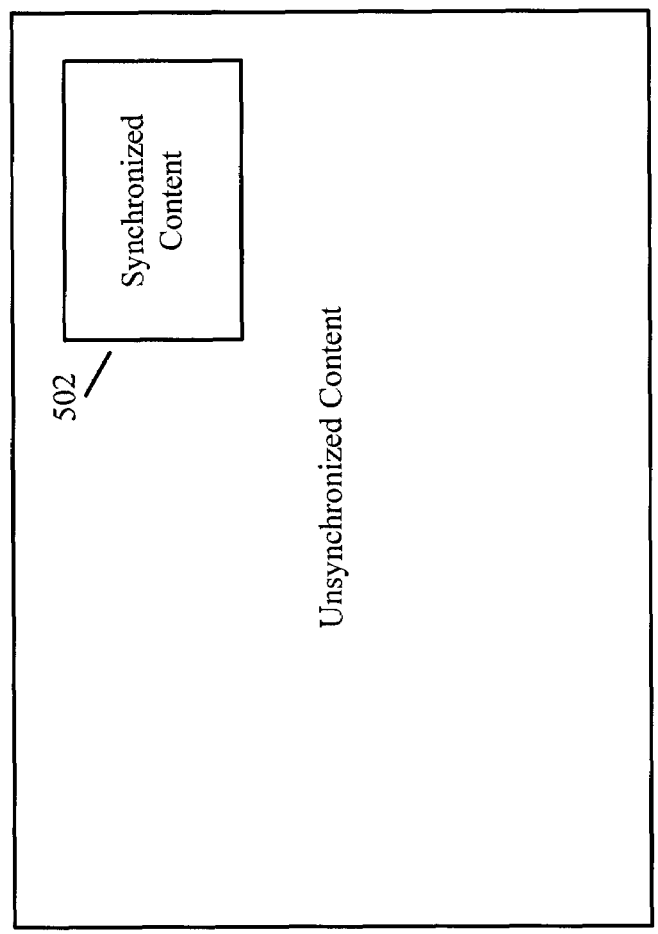
FIG. 5 illustrates a synchronized display of content at a slave set top box in accordance with exemplary embodiments.

FIG. 5 illustrates a synchronized display of content at a slave set top box in accordance with exemplary embodiments. As the event messages are received, the slave set top may cause display of the content to synchronize with the content being displayed at the master display device 106M. The content may be displayed either full screen or as a picture within a picture. FIG. 5 illustrates an example of the picture within a picture embodiments with a picture in picture display 502 depicting content being synchronized with what the master set top box 104M is causing display at the master display device 106M. The picture in picture display 502 may be displayed at the slave display device 106S along with other content. For example, the majority of the screen of the slave display device 106S may display the other content, with the picture in picture (PIP) display 502 displaying the content the master set top box 104M is causing display at the master display device 106M. The slave set top box 104S also may permit the synchronized content to switch back and forth from being with the picture in picture display 502 and being displayed full-screen. To set up covert monitoring of a master set top box 104M, the viewer at the slave user premises 114S may input an authentication code at the slave set top box 104S to set up covert monitoring.

Figure 6:
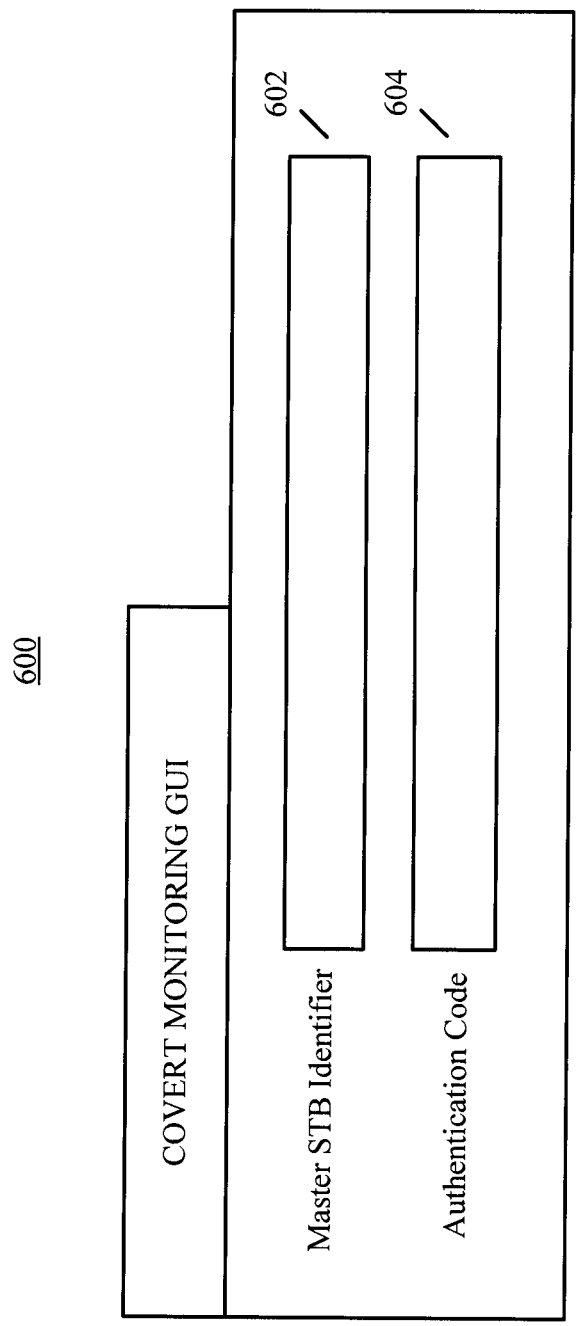
FIG. 6 illustrates a covert monitoring graphical user interface in accordance with exemplary embodiments.

FIG. 6 illustrates a covert synchronization request graphical user interface in accordance with exemplary embodiments. The covert synchronization request graphical user interface 600 may permit a parent, for example, to identify one or more master set top boxes 104M for covert monitoring by a slave set top box 104S, where the viewer (e.g., the child) at the master user premises 114M is unaware that the master set top box 104M is sending event information to enable a slave set top box 104S to synchronize with the master set top box 104M.

In an exemplary embodiment, covert synchronization request graphical user interface 600 may include an master set top box identifier field 602 and an authentication code field 604. In the authorized master set top box identification field 602, the user may identify the master set top box 104M that the user desires to covertly monitor. The authentication code field 604 may permit the viewer to establish a password or other authentication information permitting them to authenticate the viewer. This may prevent an unwanted person from gaining access and covertly monitoring and synchronizing with another set top box. The slave set top box 104S may generate a covert synchronization request including the master set top box identifier and the authentication code, and may communicate the covert synchronization request to the server 110. The server 110 may identify an authentication code associated with the master set top box identifier stored in the synchronization database 116, and may compare the stored authentication code with the authentication code received in the covert synchronization request to determine whether to permit covert synchronization with the master set top box 104M.

Figure 7:
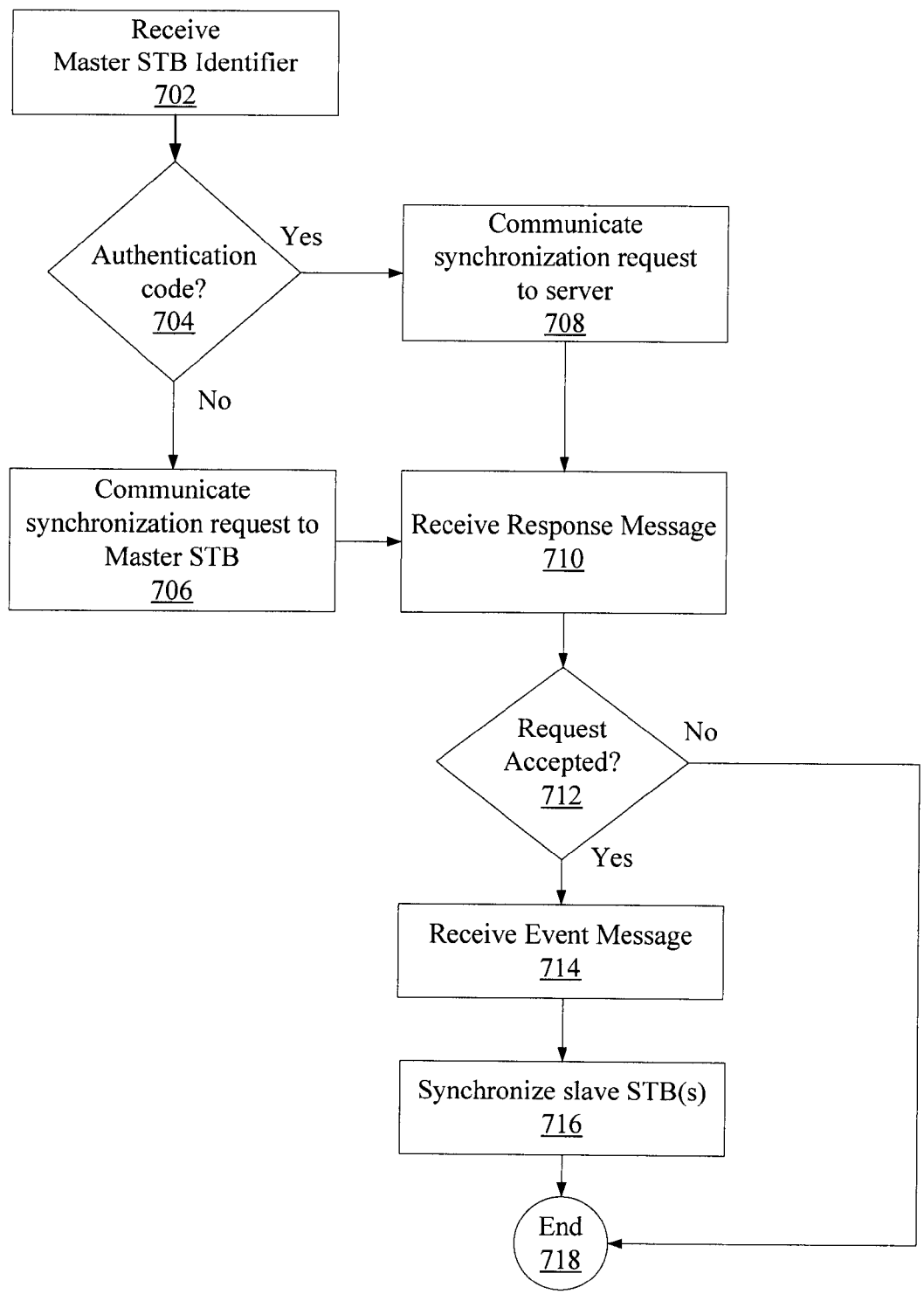
FIG. 7 illustrates a method for synchronizing a slave set top box with a master set top box in accordance with exemplary embodiments.

FIG. 7 illustrates a method for synchronizing a slave set top box with a master set top box in accordance with exemplary embodiments. This exemplary method is provided by way of example, as there are a variety of ways to carry out methods disclosed herein. The method 700 shown in FIG. 7 can be executed or otherwise performed by one or a combination of various systems. The method 700 is described below as carried out by the system 100 shown in FIG. 1 by way of example, and various elements of the system 100 are referenced in explaining the example method of FIG. 7. Each block shown in FIG. 7 represents one or more processes, methods, or subroutines carried in the exemplary method 700. Referring to FIG. 7, the exemplary method 700 may begin at block 702.

In block 702, the method may include receiving a master set top box identifier. In an exemplary embodiment, the slave set top box 104S may generate a synchronization graphical user interface 300 in response to receiving a synchronization graphical user interface display request from the user input device 112. The viewer may then input a master set top box identifier in the synchronization graphical user interface 300 to identify a master set top box with which to synchronize. The method 700 may continue to block 704.

In block 704, the method may determining whether an authentication code has been input. In an exemplary embodiment, the synchronization graphical user interface 300 may include an authentication code field 304 where the viewer may input an authentication code. If the authentication code is input, the method 700 may continue to block 708. If the authentication code is not input, the method 700 may continue to block 706.

In block 706, the method may include generating and communicating a synchronization request to a master set top box. In an exemplary embodiment, the slave set top box 104S may generate a synchronization request that includes the master set top box identifier and may communicate the synchronization request to the master set top box 104M associated with the master set top box identifier via the network 108. This branch of the method 700 may continue to block 710. Referring again to block 704, the method 700 may continue to block 708 if the viewer has input the authentication code.

In block 708, the method may include generating and communicating a synchronization request to a server. In an exemplary embodiment, the slave set top box 104S may generate a synchronization request that includes the master set top box identifier and the authentication code, and may communicate the synchronization request to the server 110. This branch of the method 700 may continue to block 710.

In block 710, the method may include receiving a response message. In an exemplary embodiment, the slave set top box 104S may receive a response message from the master set top box 104M. The response message may be an acceptance message to accept the synchronization request or a reject message to reject the synchronization request. In another exemplary embodiment, the slave set top box 104S may receive a response message from the server 110. The response message may be an acceptance message to accept the synchronization request or a reject message to reject the synchronization request for covert synchronization with the master set top box 104M based on whether the server 110 was able to authenticate the slave viewer based on the authentication code. The method 700 may continue to block 712.

In block 712, the method may include determining whether the synchronization request has been accepted. In an exemplary embodiment, the slave set top box 104S may determine whether the response message is the acceptance message or the reject message. If the reject message is received, the method 700 may continue to block 718 and end. If the acceptance message is received, the method 700 may continue to block 714.

In block 714, the method may include receiving event messages. In an exemplary embodiment, the slave set top box 104S may receive an event message from the server 110 and/or from the master set top box 104M via the network 108. The method 700 may continue to block 716.

In block 716, the method may include synchronizing the content the slave set top box causes display with the content the master set top box causes display. In an exemplary embodiment, the slave set top box 104S may process the event message to obtain the content identifier. The display module 204 of the slave set top box 104S may process the content signal to cause display of a channel and/or program based on the content identifier to synchronize the content being displayed at the slave display device 106S with the content being displayed at the master display device 106M. When a viewer desires to end synchronization, the viewer may use the user input device 112S to communicate an end message from the slave set top box 104S to the master set top box 104M via the network 108. The slave set top box 104S may then communicate an end synchronization message to instruct the server 110 and/or the master set top box 104M to end sending of the event messages. The method 700 may then continue to block 718 and end.

It is noted that the above description has described communicating event messages permitting the synchronized slave set top box 104S to display the same content that the master set top box 104M is causing to be displayed at the master display device 106M. In addition to displaying video, the slave set top box 104S also may receive the metadata associated with the content the master set top box 104M is causing display at the master display device 106M. The metadata may include information describing the content being watched at the master set top box 104M. For example, the metadata may include text, such as, but not limited to, "On today's show, guests Bob and Sally will meet with our team to discuss their latest movie," and a rating of the content (e.g., Parental Guidance, Restricted, Mature, etc.) The slave set top box 104S may receive the metadata in the event message in addition to or instead of the content identifier and the slave set top box 104S may display a log of the different metadata at the slave set top box 104S. In an exemplary embodiment, the metadata may scroll along the bottom of the slave display device 106S, or alternatively the viewer may select a key on the user input device 112 to request to view the metadata or the last previous programs being watched in a graphical user interface displayed at the slave display device 106S. In another exemplary embodiment, the slave set top box 104S may cause display of a graphical user interface (e.g., a pop-up window) at the slave display device 106S when certain conditions are met. For example, a parent may set a rule where a pop-up graphical user interface is displayed when the master set top box 106M is causing displaying of content having a Restricted rating. The slave set top box 106S may examine the metadata for the content rating, and may compare the content rating to the rule (i.e., generate a pop-up when content with a restricted rating is being displayed at the master display device 108M). If the content rating matches the rule, the slave set top box 106S may cause display of a graphical user interface at the slave display device 108S to inform the slave viewer. Other rules also may be created.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method comprising:
receiving, at a second device, a device identifier that identifies a first device and an authentication code, the first device being capable of causing display of first content at a first display device;
communicating, from the second device, a synchronization request that includes the device identifier via a network, wherein the synchronization request is communicated to a remote server configured to provide for covert and overt synchronization of the first content, wherein the synchronization request further comprises the authentication code, wherein the remote server processes the synchronization request to authenticate the authentication code to determine whether to permit covert synchronization with the first device;
determining whether to permit covert or overt synchronization, wherein covert synchronization is permitted if the authentication code validates, and overt synchronization is permitted if the authentication code does not validate and a viewer of first content at the first devices approves of overt synchronization by affirmatively responding to an overt synchronization request presented via the first display device;
receiving an event message at the second device from the first device via the network, the event message identifying the first content being displayed at the first display device, wherein the event message is useable to synchronize second content the second device causes display at a second display device with the first content the first device is causing display at the first display device, wherein the event message includes metadata describing the first content, wherein the second device causes display of a graphical user interface when the metadata satisfies a condition and automatically displays the first content at the second display device instead of the second content based on the event message when the metadata satisfies the condition.

2. The method of claim 1, further comprising processing the event message to synchronize the second content with the first content.

3. The method of claim 2, wherein the event message includes a content identifier associated with the first content, and wherein processing the event message causes the second display device to display the second content associated with the content identifier.

4. The method of claim 1, wherein the remote server communicates a covert synchronization request to the first device if the authentication code is authenticated, and an overt synchronization request if the authentication code is not authenticated.

5. The method of claim 1, wherein the synchronization request is communicated to the first device via the network.

6. The method of claim 1, further comprising receiving an acceptance message from the first device, the acceptance message indicating acceptance of the synchronization request.

7. The method of claim 1, wherein the first device comprises a set top box.

8. The method of claim 1, wherein the first device and the second device are located at a user premises.

9. The method of claim 1, wherein the first device and the second device are located remote from one another or at different locations within a user premise.

10. The method of claim 1, further comprising:
receiving an end synchronization request;
generating an end synchronization message based on the end synchronization request; and
communicating the end synchronization message to the first device via the network, wherein the end synchronization message instructs the first device to end transmission of the event message.

11. The method of claim 1, wherein the second device may cause display of the second content and unsynchronized content at the second display device.

12. The method of claim 11, wherein one of the second content and the unsynchronized content is displayed in a picture in picture display at the second display device.

13. A non-transitory computer readable medium comprising code which when executed causes a computer to perform the method of claim 1.

14. A method comprising:
receiving, by a remote server, a synchronization request from a first device via a network, the synchronization request comprising a device identifier of a second device and an authentication code, wherein the remote server provides for covert and overt synchronization of the first content, wherein the first device is causing display of first content;
querying, by the remote server, a database using the device identifier and the authentication code to determine whether to permit covert monitoring of the second device based on the authentication code, wherein the remote server processes the synchronization request to authenticate the authentication code to determine whether to permit covert synchronization with the first device; and
in the event that the authentication code is authenticated, communicating a covert synchronization request from the remote server to the second device, the covert synchronization request to instruct the second device to monitor second content being displayed at a second display device, and to generate an event message based on the second content, wherein the event message includes metadata describing the content, wherein the first device causes display of a graphical user interface when the metadata satisfies a condition and automatically causes the second content displayed at the second display device to display at the first display device instead of the first content based on the event message when the metadata satisfies the condition; and
in the event that the authentication code is not authenticated, permitting overt synchronization if a viewer of the second content at the second device approves of overt synchronization by affirmatively responding to an overt synchronization request presented via the second display device.

15. The method of claim 14, wherein the second device communicates the event message to the first device to permit the first device to synchronize second content the first device causes display with the content.

16. A method comprising:
receiving a synchronization request by a remote server via a network, the remote server provides for covert and overt synchronization of a first content;
receiving an authentication code by the remote server via the network, wherein the synchronization request further comprises the authentication code;
processing the synchronization request by the remote server to authenticate the authentication code in order to determine whether to permit covert synchronization or overt synchronization;
permitting covert synchronization if the authentication code is authenticated by the remote server, the covert synchronization comprises:
causing display of first content at a display device,
monitoring the first content being displayed to identify an event,
generating an event message based on the event, and
communicating the event message to a first device via the network, wherein the first device causes display of a second content, wherein the event message includes metadata describing the first content, wherein the first device causes display of a graphical user interface when the metadata satisfies a condition and automatically causes the first content to display at the first device instead of the second content based on the event message when the metadata satisfies the condition; and
permitting overt synchronization if the authentication code is not authenticated and a viewer of the first content at the device approves the overt synchronization request by affirmatively responding to an overt synchronization request presented via a second display device.

17. A system comprising:
a computing device communicatively coupled to a network to;
cause display of a graphical user interface and to receive a device identifier that identifies a first device, the first device causing display of first content at a first display device,
generate a synchronization request that includes the device identifier and an authentication code,
communicate the synchronization request to a remote server to validate the authentication code in order to determine whether to permit covert synchronization of the first content, wherein: if the authentication code validates, the remote server provides for covert synchronization of the first content, and if the authentication does not validate, the synchronization request is communicated to a viewer of the first device for approval of overt synchronization by affirmatively responding to an overt synchronization request presented via the first display device, and
communicate the synchronization request via the network and to receive an event message from the first device via the network, the event message identifying the first content the first device is causing display at the first display device, wherein the event message includes metadata describing the first content, wherein the computing device causes display of a graphical user interface when the metadata satisfies a condition, and to receive an authentication code via the network, wherein the synchronization request further comprises the authentication code, and wherein the computing device processes the event message to cause display of first content instead of second content when the metadata satisfies a condition.

18. A system comprising:
a remote server to;
receive a synchronization request via a network, wherein the synchronization request includes a device identifier that identifies a first device, the first device being capable of causing display of first content at a first display device, wherein the remote server provides for covert and overt synchronization of the first content,
determine whether to provide for covert or overt synchronization of the first content, wherein the remote server processes the synchronization request to authenticate the authentication code to determine whether to permit covert synchronization with the first device,
approve overt synchronization via a display device if covert synchronization does not validate,
communicate an event message via the network, the event message identifying the first content the first device is causing display at the first display device, wherein the event message includes metadata describing the first content, and
receive an authentication code via the network, wherein the synchronization request further comprises the authentication code, and wherein the event message is useable to synchronize second content a second device causes display at a second display device with the first content the first device is causing display at the first display device, wherein the second display device causes display of a graphical user interface when the metadata satisfies a condition and automatically displays the first content at the second display device instead of the second content based on the event message when the metadata satisfies the condition.

* * * * *